Aug. 13, 1974  JEAN-PIERRE WAQUIER ET AL  3,829,293
CRYSTALLIZATION APPARATUS

Filed March 30, 1973

3,829,293
CRYSTALLIZATION APPARATUS
Jean-Pierre Wauquier, Givors, France, and Herbert Friedrich Wiegandt, Ithaca, N.Y., assignors to Institut Francais du Petrole, des Carburants et Lubrifiants, Rueil-Malmaison, France
Filed Mar. 30, 1973, Ser. No. 346,455
Claims priority, application France, Apr. 31, 1972, 7211705
Int. Cl. B01d 9/02
U.S. Cl. 23—273 R    7 Claims

ABSTRACT OF THE DISCLOSURE

This apparatus comprises an elongated enclosure subdivided into compartments by rigidly arranged plates. The plates are designed in such manner as to leave passage to a vertical shaft provided with blades, when disassembling the apparatus.

---

Figure 1:
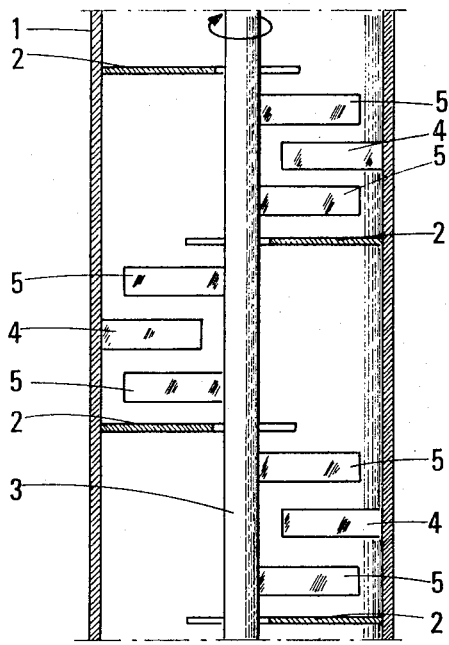

The invention concerns a new crystallization device. It particularly concerns a new device for carrying out the formation and the separation of crystals from a solution.

The known techniques had solved the problem of carrying out crystallization in various manners:

according to processes of a first type, the solution was cooled and crystallized by indirect heat exchange with the cooling fluid; the latter flowed through a coiled immersed in the solution to be crystallized. In that case, the thermodynamic yield was low, on account of losses;

according to processes of another type, the cooling fluid, usually a liquefied gas, was directly introduced into the solution to be crystallized: the vaporization of this fluid inside the reactor provided for the cooling required for crystallizing. The solution, the partially vaporized cooling fluid and the crystals were usually moved in the same direction.

In the two cases, the crystallization device consisted of a mere closed enclosure, sometimes provided with a simple stirrer. The boiling of the coolant was essentially responsible of the stirring.

Although the thermodynamic yield in the second case was better than in the first one, this system had several drawbacks.

In addition to the difficulties inherent to gas handling, this system has the inconvenience of requiring high compression expenses. In most cases, it was necessary to make use of several auxiliary fluids employed according to a so-called cascade cooling device; only the last one of these fluids being used for the crystallization.

On the other hand, since vaporizing is an uncontrollable step, it was difficult to obtain an easy control of the crystallization rate.

Other processes have also been proposed, for example that described in the French Pat. 1528593, according to which the solution to be crystallized is placed in direct heat exchange with the immiscible liquid coolant, said exchange being obtained by counter-currently flowing the two liquids. In these processes, the two liquids and the crystals flowed from a stirring and mixing zone, in which an intimate contact of the three phases, two by two, occurred, thus permitting a good heat and matter exchange, to a relatively quieter zone of partial separation, where the cooling liquid and the crystals separate from the second liquid phase, the passage from one zone to another being separated several times.

According to these processes, the crystals are moved in opposite direction with respect to the solution and in the same direction as the cooling liquid. The latter had to be so selected as to be lighter than the solution when the crystals are themselves lighter than their mother-solution, or, on the contrary, heavier when the crystals are themselves heavier than their mother-solution.

As a result of the counter-current flow and the repeated intimate mixture of the 3 phases (two liquid phases, one solid phase), the thermodynamic yield of the operation was satisfactory; these processes had also the advantage of being much more easily controlled than those using a gas vaporization, which constitutes a hardly controllable operation.

The crystallizer employed for working out these processes was a substantially vertical, preferably cylindrical, tower; the feed charge, i.e. the solution to be crystallized, was introduced in the lower section of the tower. The immiscible liquid cooling agent was introduced in the upper section thereof. The mother-liquor or impoverished solution was also discharged from the top of the tower.

Figure 5:
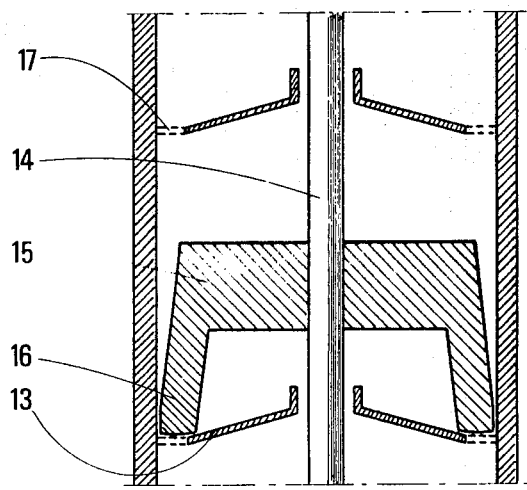

According to the French Pat. No. 1528593, the device for carrying out the process (FIG. 5 illustrates schematically a portion of the column, which forms no part of the invention) consists of a vertical, preferably cylindrical tower provided with fluid inlets and outlets, divided into compartments, each corresponding to one stage by a plurality of generally conical stationary plates (13) integral with the walls, each plate having perforations (17) on its external portion, i.e. near the walls of the tower, and a central opening located at a different level than the perforations, said opening being traversed by a rotatable vertical shaft (14) carrying vanes (15) provided with blades (16), adapted to sweep the perforations of the plate and to provide, between the center of each plate and the rotatable shaft, a free space or chimney for conveying one of the crystal-free liquid phases, whereas the crystals and the other phase pass through the different compartments across the perforations of the plates.

The arrangement of this type of apparatus results in a progressive clogging by crystal deposition. This clogging impedes the correct working of the apparatus and limits the efficiency of the heat transfer between the cooling fluid and the solution which contains a crystallizable component.

The apparatus of the invention finally remedies to these drawbacks. It has the further advantage of being operable with an immiscible cooling liquid either lighter or heavier than the solution irrespective of whether the formed crystals are themselves lighter or heavier than their mother-solution.

The method for carrying crystallization in the apparatus of the invention consists of cooling a liquid mixture of at least 2 components by direct heat exchange with an immiscible liquid coolant circulated counter-currently with this mixture and introduced at a sufficiently low temperature for crystallizing out one of said components, the density of the immiscible liquid coolant being sufficiently different from that of the liquid mixture for permitting the liquid coolant and the liquid mixture to circulate in counter-current; the crystallization is carried out in a substantially vertical elongated enclosure closed at both ends, the immiscible liquid coolant being fed at the upper or lower end, depending on the fact it is heavier or lighter than the liquid mixture, the latter being introduced at an intermediary point between the two ends of the enclosure. The method differs from that of the French Pat. 1528593 in that the crystallization is carried out in vertically arranged successive zones separated from one another by horizontal walls arranged between the two ends of the elongated enclosure, and in which the two liquids flow counter-currently, a partial crystallization of the initial liquid mixture taking place by intimate stirring of the liquid mixture with the immiscible liquid coolant, said stirring being carried out in the whole space of each of said zones, in that the liquid mixture is moved from each of the zones towards a following stirring zone through at least one passage between said zones, in that the coolant is displaced towards a prior stirring zone through at least said passage between said zones, the said liquid mixture is intimately mixed again with a new portion of coolant relatively colder than that of the prior stirring zone, so as to form additional crystals and this passage from a prior zone to a next zone is repeated several times, so that the crystals are carried along with the one or the other of the two liquids circulated counter-currently, according to the hydrodynamic and thermal conditions prevailing in the enclosure and the specific characteristics of the components, particularly the specific weight.

Figure 2:
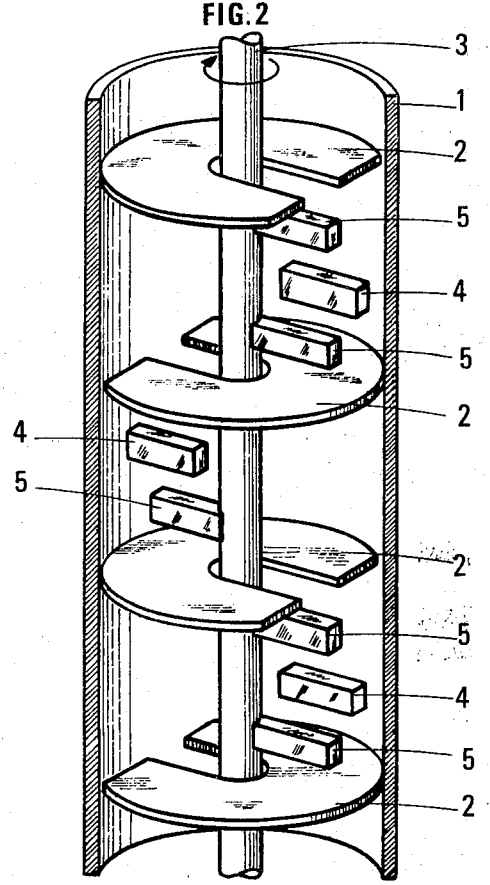

FIGS. 1 and 2 illustrate the new apparatus. For sake of simplicity, in the following description and examples, reference is always made to a liquid coolant heavier than the liquid mixture, one component of which is to be crystallized.

The apparatus of the invention consists of an elongated enclosure, for example a substantially vertical preferably cylindrical column provided with inlets and outlets for the fluids, including the recycled ones. The liquid coolant and the liquid mixture may be supplied by means of devices, not shown in these figures, permitting their introduction either as a continuous phase or as a dispersed phase. The top (upper portion) of the apparatus may have an enlarged section. The immiscible liquid coolant, heavier than the liquid mixture, is supplied to the upper portion of the apparatus and the liquid mixture to an intermediary point of the column between the two ends thereof. The column, whose horizontal cross-section is usually curvilinear, for example circular or ellipsoidal, or at least a portion of the column, is divided into successive compartments by a plurality of stationary plates integral with the walls of the column. The two liquid phases circulate counter-currently through these successive compartments and the formed crystals are carried along with one of these two liquids. The apparatus is characterized by a new arrangement of the compartments. The FIGS. 1 and 2 represent a preferred arrangement of these compartments, FIG. 1 being a plane view and FIG. 2 a three-dimensional view. Four plates (2) integral with the wall (1) of the column are shown in FIGS. 1 and 2. The column includes a rotatable vertical shaft (3).

When the column is cylindrical, each plate is shaped:

either as a circular sector (portion of a circle limited by two radii);
or as a circular segment (surface limited by an arc of circle and its subtense shape);
or has any shape equivalent to the preceding ones, e.g., a disk at least one half of which is integral with the wall, the other part of the disk comprising at least one cut out part so as to leave passage for the blades (defined above) which are integral with the rotation shaft, when disassembling the apparatus.

When the column is not cylindrical, the plates have any shape equivalent to the preceding ones.

In the following description and claims, for sake of brevity, the plates (2) will be referred to as substantially horizontal disk portions; the area of each plate is greater than the half-section of the column; these plates have at their center a cut out portion so as to leave passage to the rotatable vertical shaft when the apparatus is in operation and to the rotatable vertical shaft with the blades when the apparatus is disassembled.

The are so arranged that the openings or cut out portions of two successive plates (2) are diametrally opposed or staggered by a constant angle, although without possible super-position. On FIGS. 1 and 2, the cut out portions are diametrally opposed according to the generally preferred arrangement. At least one blade (4) integral with the wall (1) of the column is provided in each compartment limited by the plates (2); the axis of each blade (4) is parallel to the planes of the plates (2) and has a substantially radial direction. The blades (4) usually consist of metal plates of elongated rectangular shape, as illustrated by FIG. 2; by way of preference, each compartment has a single blade (4) placed substantially at half-way between two adjacent plates; in that case, the blades (4) are all staggered, with respect to one another by the same angle as the plates (2). In FIGS. 1 and 2, showing one blade (4) per stage, the blades are staggered with respect to one another by 180°. On FIG. 2, each blade (4) is placed below the cut out portion of the vicinal upper plate, but this arrangement is not obligatory. Blades (5) are provided on the vertical shaft (3) whose rotation speed is dependent on the diameter of the column and usually in the range of from 1 to 6 r.p.m. for a column of 500 mm. diameter, this speed being optionally reduced for greater diameters, said blades (5) usually consisting of metal plates of elongated rectangular shape whose axis is parallel to the planes of the plates (2). At least two blades (5) are provided in each compartment; and preferably two blades are provided in each compartment where they are located respectively one below the upper plate of the compartment and above a blade (4) and the other above the lower plate of the compartment and below a blade (4).

In other words, considering the column from the bottom to the top thereof, there are successively provided, in each compartment, a plate (2), a blade (5), a blade (4), another blade (5) and another plate (2).

The axis of each blade (5) is, for example, at half-way between the axis of the closer plate and the axis of the closer blade (4). The space between a blade (4) and a blade (5) or the space between a blade (5) and a plate may be as small as desired, provided any friction is avoided. It may be noted that all the zones of each compartment of the column are thus weakly stirred.

Optionally, a plurality of compartments separated by plates (2) may be arranged in the lower portion of the crystallization column, at the level of the feed charge inlet pipe, but without any blades (4) or blades (5) therein. These compartments form a heat exchange zone between the just introduced feed charge and the liquid coolant; a good dispersion and transfer of the charge takes place in this heat exchanger; the crystals appear in the other upper compartments arranged as shown on FIGS. 1 and 2. Also optionally, a zone may be provided in the upper portion of the crystallization column, where the blades (4) and (5) are present but not the plates (2).

The other parts of the apparatus need not to be described, e.g. the devices for introducing, injecting or discharging the liquid fluids or the crystals, these devices being well-known. Reference is made, for example, to the French Pats. Nos. 1528593 and 1556957.

When selecting an immiscible liquid coolant heavier than the liquid mixture and also heavier than the formed crystals, the liquid mixture goes up counter-currently to the immiscible liquid coolant which goes down. Two cases are possible: either the crystals are heavier than the feed charge (case A) or they are lighter than the charge (case B).

Figure 3:
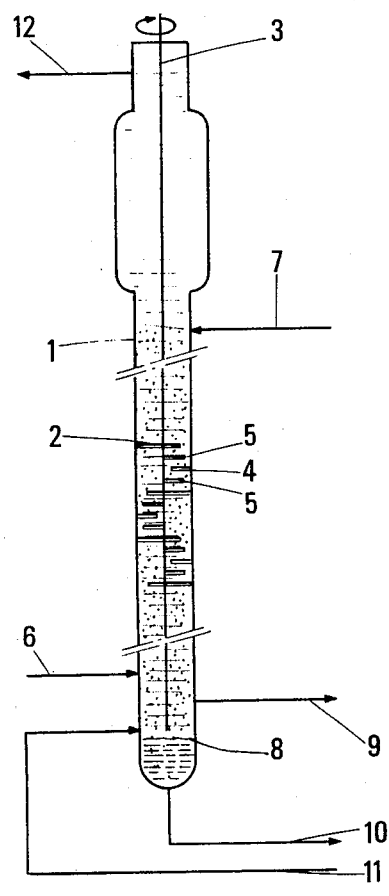

(A) When the crystals are heavier than the charge, two working possibilities $\alpha$ and $\beta$ may occur:

($\alpha$) FIG. 3 illustrates this first possibility: There is used a crystallizer, optionally with an enlarged upper portion, provided with compartments such as hereinbefore described, separated by plates (2), containing blades (4) integral with the wall (1) of the crystallizer and also provided with a shaft (3) bearing blades (5); the liquid mixture is supplied from pipe (6) and forms a continuous phase in the crystallizer; the liquid immiscible coolant is supplied as droplets from pipe (7), thus forming in the crystallizer a dispersed phase. The intimate mixture of the two liquids takes place in the zones provided between two plates (2). In each stage, the formed crystals are lighter than the liquid coolant but heavier than the liquid mixture. They separate and go down by gravity into the next lower stage, together with the droplets of liquid coolant also heavier than the liquid mixture. At the bottom of the crystallizer, the droplets of liquid coolant accumulate and form a continuous phase, separated from the liquid mixture by interface (8). The immiscible liquid coolant is discharged from the crystallizer through a pipe (10). The crystals being lighter than the liquid coolant, accumulate on the interface (8) which they cannot trespass and form a crystal mud. At the level of this bed, a pipe (9) is provided for crystal discharge; the latter may be carried along by means of a liquid injected in the lower portion of the crystallizer from pipe (11) opening at the level of the crystal bed; the liquid supplied from pipe (11) usually consists of the liquid recovered after filtration of the crystals discharged through pipe (9). The liquid mixture progressively goes up through the compartments of the crystallizer; when arriving at the top thereof, it is substantially free of one of the components and is discharged through pipe (12). Thus, according to this embodiment α, the crystals move counter-currently to the liquid mixture from which they are formed.

Sometimes, particularly if the rate of introduction of the liquid mixture is too high, it happens that crystals, although heavier than the liquid mixture, are carried along with the liquid mixture to the top of the crystallizer; this progressively disturbs the operation of the apparatus; in this case, it may be advantageous to discharge all the crystals from the top of the apparatus: this is the second possibility β already mentioned.

Figure 4:
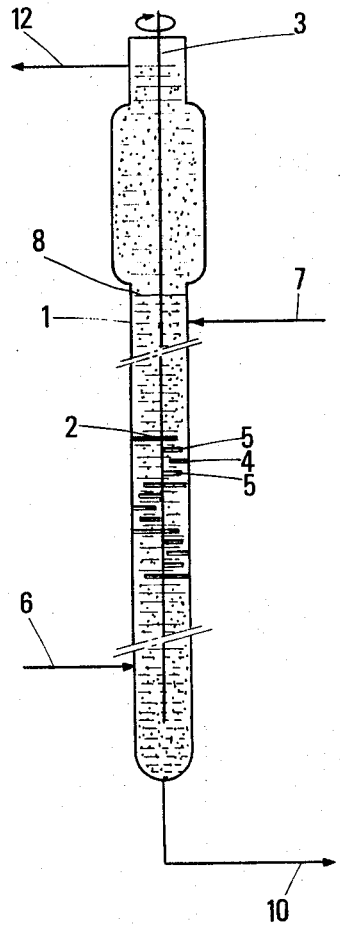

(β) FIG. 4 illustrates this second possibility:

The apparatus is the same as that of FIG. 3, except that the pipe (9) for crystal discharge and the pipe (11) have been omitted. The apparatus works as follows: the column is filled up from pipe (7) with liquid coolant which forms in the column a continuous phase, not a dispersed phase as disclosed in the first embodiment α; the level of liquid coolant in the column is the interface (8) usually located above the pipe (7). The liquid mixture is supplied to the column through pipe (6), in the form of dispersed droplets (dispersed phase, not continuous as according to the embodiment α). By working in this way, the formed crystals, although heavier than the liquid mixture from which they are formed, are carried along with the latter towards the upper portion of the apparatus. The crystals are carried along at least up to the interface (8); there is advantage to place the interface at the highest possible level, preferably above pipe (7). The crystals form a crystal mud at the level of the interface and are then easily discharged through pipe (12) with the improvement liquid mixture; the latter obviously forms a substantially continuous phase above the interface (8).

According to this second embodiment β, there is provided a co-current of the liquid mixture and the formed crystals.

By way of example, one of the possibilities α and β is the crystallization of para-xylene from an aromatic C₈ cut comprising the three isomeric xylenes (ortho, meta and para-xylene) and ethylbenzene. It is known to use in that case a salt solution, optionally containing appropriate additives, as liquid coolant, or, as described in the French Pat. No. 1568747 of Apr. 21, 1969, a mixture containing at least water, an alcohol and a glycol.

(B) When the crystals are heavier than the feed charge, the following embodiment may be used: the apparatus is that of FIG. 4 and the crystals are carried along to the top of the column with the liquid mixture, the latter forming the dispersed phase of the column while the liquid coolant forms the continuous phase. The interface (8) is thus located in the upper portion of the apparatus.

The following non-limitative examples illustrate the invention.

EXAMPLE 1

The apparatus is that of FIG. 3. It is used for crystallizing para-xylene from a liquid mixture containing 20% of para-xylene, 4.5% of ortho-xylene, 58% of meta-xylene and 17.5% of ethylbenzene by weight. This mixture is introduced through pipe (6) at a temperature of −30° C., i.e. a temperature substantially higher than the point of initial crystallization i.e. 42° C. in that case.

The feeding rate is 1500 kg. per hour. Ten meters separate the pipe (6) from the pipe (12) designed for the discharge of the impoverished mixture. The cylindrical column, having a 50 cm. of diameter, is provided with 28 compartments containing plates (2) and blades (4) and (5). Below the 28 compartments, 7 further compartments are provided with plates (2), but without blades; these 7 compartments have a total height of 1 meter, as calculated from the bottom of the apparatus. The rotational speed of the shaft (3) is 4 r.p.m. The position of the interface (8) is 1.5 meter lower than the point at which the feed charge is supplied. The brine is supplied from pipe 7, the latter being located about 1 meter below pipe 12, in dispersed form, at an initial feeding rate of 1600 liters per hour and at the temperature of −74° C. The brine is an aqueous solution of lithium chloride (25% b.w. of anhydrous lithium chloride). The mother-liquor or impoverished mixture is discharged at −66° C. through pipe (12) at a rate of 1320 kg. per hour and has the following composition by weight: 9% of paraxylene, 5% of orthoxylene, 66% of metaxylene and 20% of ethylbenzene. The paraxylene crystal mud is discharged through pipe (9), at a total rate of 900 kg. per hour, comprising 180 kg. of solid material and 720 kg. of liquid material. Its global composition by weight is:

40% of paraxylene, 3.5% of orthoxylene, 43.5% of metaxylene and 13% of ethylbenzene. After filtration, the filtrate is fed back to the column through line 11 at a rate of 720 kg. per hour.

The composition of the filtrate is:

| | Percent |
|---|---|
| Paraxylene | 25.5 |
| Orthoxylene | 4.2 |
| Metaxylene | 54 |
| Ethylbenzene | 16.3 |

EXAMPLE 2

Example 1 is repeated with the apparatus of FIG. 4, the same liquid mixture and the same brine, the liquid being supplied to the column at the same temperatures and feeding rates as in Example 1, except that the liquid mixture now forms the dispersed phase within the column. The formed paraxylene crystals are discharged through pipe (12) from the top of the apparatus, together with the impoverished liquid mixture. The interface (8) is located 0.5 meter below the pipe (12).

The global composition of the effluent is the same as that of the feed charge, except that the effluent is composed of two portions:

The solid portion consisting of 180 kg. of paraxylene crystals per hour.

The liquid portion (1320 kg. per hour) comprising by weight:

| | Percent |
|---|---|
| Paraxylene | 9 |
| Orthoxylene | 5 |
| Metaxylene | 66 |
| Ethylbenzene | 20 |

What we claim is:

1. An apparatus for crystallization comprising a substantially verical elongated enclosure provided with means for supplying and for withdrawing fluids, said means for supplying and withdrawing fluids comprising a first opening at the top of the enclosure, a second opening below the first opening and above said compartments, a third opening below the compartments, and a fourth opening at the bottom of the enclosure below said third opening, at least a portion of said enclosure being divided into successive compartments, each corresponding to one stage, by a plurality of plates integral with the wall of the enclosure, said enclosure comprising a rotatable vertical shaft, wherein the said plates are substantially horizontal, disk portions and are so arranged as to be all staggered by a constant angle with respect to the next upper or lower plate, each compartment being defined by two of said plates in succession and being provided with at least one blade integral with the wall of said enclosure and whose axis is parallel to the planes of the plates and in a radial direction, said blades being all staggered by the same angle as the plates, at least two blades are arranged on the rotatable vertical shaft, the axis of each of them being parallel to the planes of the plates, at least one of them being located in each compartment between the upper plate thereof and a blade integral with the wall of said enclosure, and at least one other between the lower plate of the stage and a blade integral with the wall of said enclosure, each of said plates being provided with a cut out part at its center and extending to its side, so as to leave passage for the rotatable vertical shaft and the blades integral with the shaft, when disassembling the apparatus, the area of each plate being greater than the half-section of said enclosure.

2. Apparatus according to claim 1, wherein a blade integral with the wall of said enclosure is provided in each compartment, the axis of said blade being parallel to the planes of the plates and in a radial direction in the enclosure, said blade being substantially at half-way between the two adjacent plates of the compartment, and two blades are rigidly arranged on the rotatable vertical shaft, the axis of each of them being parallel to the planes of the plates, at least one blade being located in each compartment at half way between the higher plate of the compartment and the blade integral with the wall of the enclosure, and at least one other blade at half way between the lower plate of the compartment and the blade integral with the wall of the enclosure.

3. Apparatus according to claim 1, wherein the staggering angle of each plate with respect to the next upper or lower plate is about 180° C.

4. Apparatus according to claim 1, wherein the ratio of the height of each stage to the diameter of the enclosure is from 0.2 to 0.4.

5. Apparatus according to claim 1, further comprising in the lower portion of the enclosure, at least one compartment provided with plates but without any blade integral with the enclosure wall or integral with the vertical shaft.

6. Apparatus according to claim 1, further comprising, in the upper portion of the enclosure, a zone provided with at least one blade integral with the enclosure wall and at least one blade integral with the shaft, but without plates.

7. Apparatus as defined by claim 1 wherein said blades on said rotatable vertical shaft have flat vertical and horizontal sides.

References Cited
UNITED STATES PATENTS

| | | | |
|---|---|---|---|
| 3,192,125 | 6/1965 | Sparks | 23—270 R |
| 2,663,623 | 12/1953 | Anderson | 23—270 R |
| 3,607,392 | 9/1971 | Lauer | 23—273 R |
| 2,813,851 | 11/1957 | McKay | 23—273 F |
| 2,570,612 | 10/1951 | Vahl | 23—270.5 |
| 3,615,243 | 10/1971 | Scott | 23—273 R |
| 3,531,944 | 10/1970 | Tindley | 23—273 R |
| 3,726,715 | 4/1973 | Mushack | 23—270 R |

FOREIGN PATENTS

| | | | |
|---|---|---|---|
| 929,062 | 6/1955 | Germany | 23—270.5 |

NORMAN YUDKOFF, Primary Examiner

S. J. EMERY, Assistant Examiner

U.S. Cl. X.R.

23—270, 795

UNITED STATES PATENT OFFICE
CERTIFICATE OF CORRECTION

Patent No. 3,829,293  Dated 8/13/74

Inventor(s) Jean-Pierre Wauquier, et al.

It is certified that error appears in the above-identified patent and that said Letters Patent are hereby corrected as shown below:

IN THE HEADING:

The claim of priority should read -- application France, March 31, 1972 --.

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,829,293           Dated    August 13, 1974

Inventor(s) Jean-Pierre WAUQUIER, et al.

It is certified that error appears in the above-identified patent and that said Letters Patent are hereby corrected as shown below:

IN THE TWO SHEETS OF DRAWINGS:

The inventor's name,"Jean-Pierre Waquier" should read

-- Jean-Pierre Wauquier --.

Signed and sealed this 31st day of December 1974.

(SEAL)
Attest:

McCOY M. GIBSON JR.
Attesting Officer

C. MARSHALL DANN
Commissioner of Patents